United States Patent
Babarao Jogdand

(10) Patent No.: US 12,542,432 B2
(45) Date of Patent: Feb. 3, 2026

(54) SAVER CLAMP ASSEMBLY

(71) Applicant: Ram Babarao Jogdand, Pune (IN)

(72) Inventor: Ram Babarao Jogdand, Pune (IN)

(*) Notice: Subject to any disclaimer, the term of this patent is extended or adjusted under 35 U.S.C. 154(b) by 776 days.

(21) Appl. No.: 15/733,555

(22) PCT Filed: Aug. 24, 2020

(86) PCT No.: PCT/IB2020/057891
§ 371 (c)(1),
(2) Date: Aug. 27, 2020

(87) PCT Pub. No.: WO2021/038423
PCT Pub. Date: Mar. 4, 2021

(65) Prior Publication Data
US 2022/0190579 A1    Jun. 16, 2022

(30) Foreign Application Priority Data
Aug. 26, 2019   (IN) .............................. 201921034349

(51) Int. Cl.
*H02G 7/05*        (2006.01)
*H02G 7/00*        (2006.01)

(52) U.S. Cl.
CPC .................................. *H02G 7/056* (2013.01)

(58) Field of Classification Search
CPC ............ H02G 7/056; H02G 7/02; H02G 1/00; H02G 7/00; H02G 7/04; H02G 7/08; H02G 7/12; H02G 7/14; H02G 7/20; H02G 1/02
USPC ....... 174/40 R, 42, 44, 45 R, 45 TD, 40 CC, 174/40 TD
See application file for complete search history.

(56) References Cited

U.S. PATENT DOCUMENTS

| | | | | |
|---|---|---|---|---|
| 3,582,983 A * | 6/1971 | Claren | ................... | H02G 7/125 174/42 |
| 3,702,371 A * | 11/1972 | Bloch | ................... | H02G 7/125 174/42 |
| 4,012,581 A * | 3/1977 | Hawkins | ................ | H02G 7/125 174/42 |
| 4,480,149 A * | 10/1984 | Hawkins | ................ | H02G 7/125 174/42 |
| 5,371,320 A * | 12/1994 | Torok | ..................... | H02G 7/125 174/42 |
| 7,368,660 B2 * | 5/2008 | Hardy | .................... | H02G 7/053 174/45 R |
| 7,392,585 B2 * | 7/2008 | Ostendorp | ............... | H02G 7/18 174/40 CC |

* cited by examiner

*Primary Examiner* — Angel R Estrada

(57) ABSTRACT

A saver clamp assembly is provided herein. The assembly includes a plurality of triangular flat plates 1 with rounded edges 10, 11, 12, a yoke plate 2 having two rounded edges 13, 14 respectively and a triangular shaped third edge 18, a plurality of turn buckle 3 connected to both the edges of the triangular plate 1 at one end, a bypass clamp 5 having multiple U shaped grooves 16 on top and an arc groove 17 centered on opposite side of the grooves to accommodate the power line, wherein the bypass clamp secures other end of plurality of turn buckle 3 through metal plates 6 which is sitting on the grooves and tightened to the clamp 5 using plurality of nuts and bolts, thus forming the saver assembly.

9 Claims, 6 Drawing Sheets

SAVER CLAMP ASSEMBLY

BACKGROUND

Technical Field

The embodiments herein generally relate to a dead end clamp assembly and more particularly to, a saver clamp assembly used to secure overhead lines or power lines and prevent from conductor snapping.

Description of the Related Art

Compression type Dead End clamps are being used to hold the conductors on a Tension towers since many years because of its high Mechanical reliability and Electrical continuity. Due to excessive vibration of conductor and other environmental conditions, improper crimping during construction, poor workmanship, aging effect etc. may result in weakening of the crimped portion of dead end clamp of conductor over a period of time. As a result, snapping of conductors from the crimped portion is generally observed.

Traditionally, conventional (compression type) dead end clamps are used to hold the AAAC conductors on Tension towers for its high mechanical reliability. These conductors traverse over railway crossings, highways, creeks and slums in developing nations. Failure of the conventional dead end clamps had resulted in conductor snapping affecting the stakeholders at a large. Usually the fracture occurs in the compression clamp (Dead End Clamp) just adjacent to the I-Bolt end AAA conductor. The fracture surfaces of the compression clamp is a typical brittle fracture without any noticeable ductility at the fracture. The fractured surface may also be due to localized de-colorization at the cross-section region of the compressed clamp. Also, the accumulation of carbonaceous material at the bottom half of the clamp. Mere failure of dead end clamp can be attended by replacing new one with required length of new conductor. However, impact of conductor snapping due to failure of dead end clamp is un-repairable as it endanger human life, tangible assets, affects other utilities, power supply interruption and many more.

As is the case with most of the developing/developed countries facing the issue of snapping of conductor due to the failure of crimped dead end used any type of conductors. Most of the transmission lines generally pass over a densely populated area, Rivers/Creeks, Railway lines, Power lines, National Highway etc. There is a grave danger of conductor snapping of these overhead transmission lines over any of the above, which may result in loss of life and property. The snapping of conductor in an overhead transmission lines is a huge mishap and is a major concern for all transmission utilities worldwide.

Mere failure of dead end clamp can be attended by replacing new one with required length of new conductor. However, impact of conductor snapping due to failure of dead end clamp is un-repairable as it endangers human life, tangible assets, affects other utilities, power supply interruption and many more. Hence, it has become very essential now to design/develop such a product which will prevent the snapping of conductor without affecting the power flow in case of failure of dead end clamp.

SUMMARY

The present embodiments provide herein a saver assembly. The assembly includes a plurality of triangular flat plates with rounded edges, wherein the plate is triangularly curved between edges to accommodate a dead end connector with a power line, a yoke plate having two rounded edges respectively and a triangular shaped third edge, wherein the yoke plate secures the plurality of triangular flat plates with nuts and bolts, a plurality of turn buckle connected to both the edges of the triangular plate at one end; and a bypass clamp having multiple U shaped grooves on top and an arc groove centered on opposite side of the grooves to accommodate the power line, wherein the bypass clamp secures other end of plurality of turn buckle through metal plates which is sitting on the grooves and tightened to the clamp using plurality of nuts and bolts, thus forming the saver assembly.

In an embodiment, the turn buckle axially swivels along body when there is a pressure on the power line. Here, the bypass clamp may be made from an aluminium alloy. The dead end connector may be made from an aluminium alloy.

In an embodiment, the saver assembly as claimed in claim 1, wherein the triangular flat plate is made from mild steel. Here, the a plurality of turn buckle may be secured to the triangular flat plates through nuts and bolts.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

The embodiments herein will be better understood from the following detailed description with reference to the drawings, in which.

Figure 1:
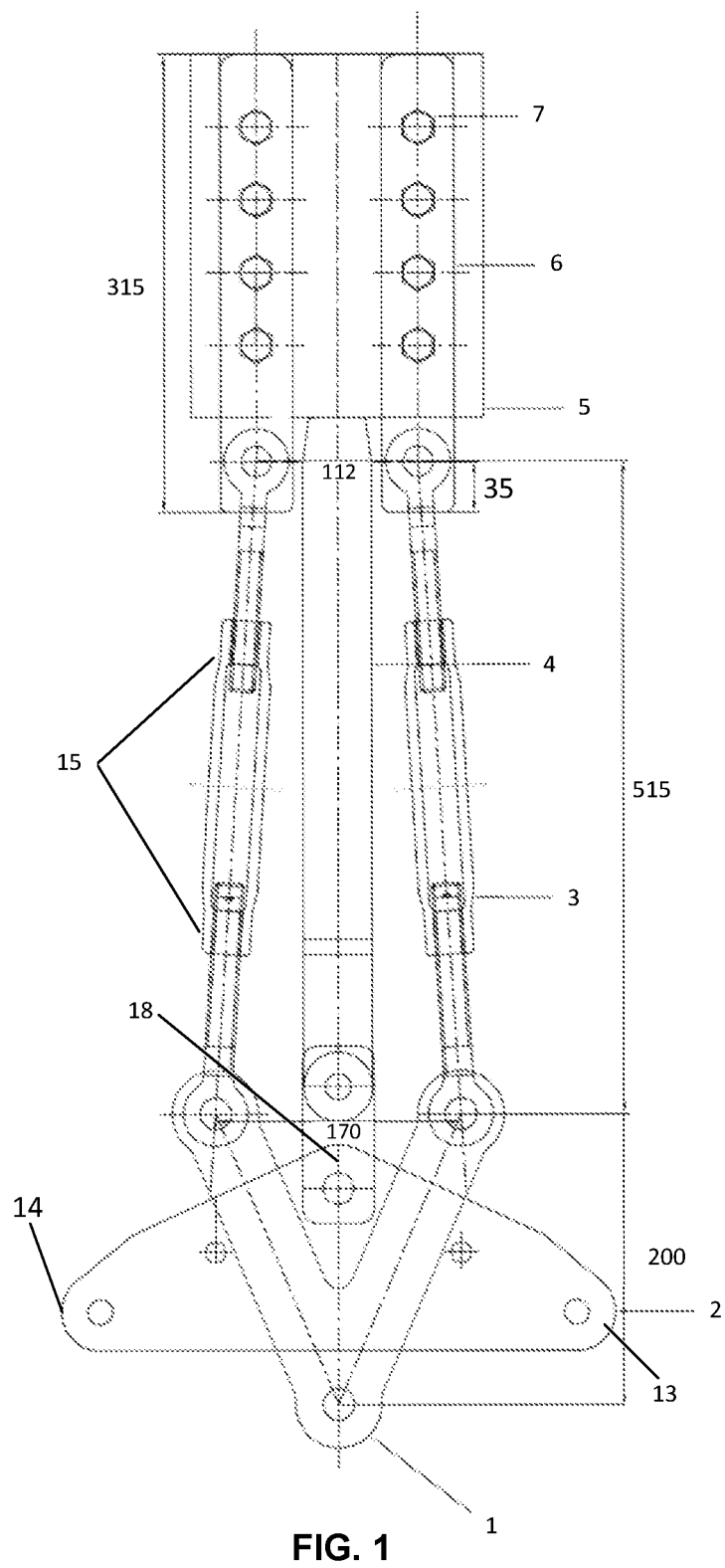
FIG. 1 illustrates a top schematic view of a saver assembly according to an embodiment mentioned herein.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF PREFERRED EMBODIMENTS

Although specific terms are used in the following description for the sake of clarity, these terms are intended to refer only to the particular structure of the invention selected for illustration in the drawings, and are not intended to define or limit the scope of the invention.

References in the specification to 'one embodiment_ or 'an embodiment_ member that a particular feature, structure, characteristics, or function described in connection with the embodiment is included in at least one embodiment of the invention. The appearances of the phrase 'in one embodiment_ in various places in the specification are not necessarily all referring to the same embodiment.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present embodiments herein provide a robust SAVER Assembly for the application on any type of transmission lines which will mitigate issues of snapping of conductor in case of failure of dead end clamp. Referring now to the figures, more particularly from FIG. 1 through FIG. 6, where similar reference characters denote corresponding features consistently throughout the figures, preferred embodiments are shown.

FIG. 1 illustrates a top schematic view of a saver assembly according to an embodiment mentioned herein. Mere failure of dead end clamp can be attended by replacing new one with required length of new conductor. However, impact of conductor snapping due to failure of dead end clamp is un-repairable as it endanger human life, tangible assets, affects other utilities, power supply interruption and many more. Hence, it has become very essential now to design/ develop such a product which will prevent the snapping of conductor without affecting the power flow in case of failure of dead end clamp.

The assembly provided herein includes a plurality of triangular flat plates 1 with rounded edges 10, 11, 12, a yoke plate 2 having two rounded edges 13,14 respectively and a triangular shaped third edge 18, a plurality of turn buckle 3 connected to both the edges of the triangular plate 1 at one end, and a bypass clamp 5 having multiple U shaped grooves 16 on top and an arc groove 17 centered on opposite side of the grooves to accommodate any type of transmission or power line.

In an embodiment, the yoke plate secures the plurality of triangular flat plates with nuts and bolts. Here, a plurality of turn buckle 3 may be connected to both the edges of the triangular plate 1 at one end through nuts and bolts. In one embodiment, the turn buckle swivels axially along body 15 when there is a pressure on the power line. The dead end connector 4 may be made from an aluminium alloy. In an embodiment, the triangular flat plate and the steel plate is of any thickness.

Figure 2:
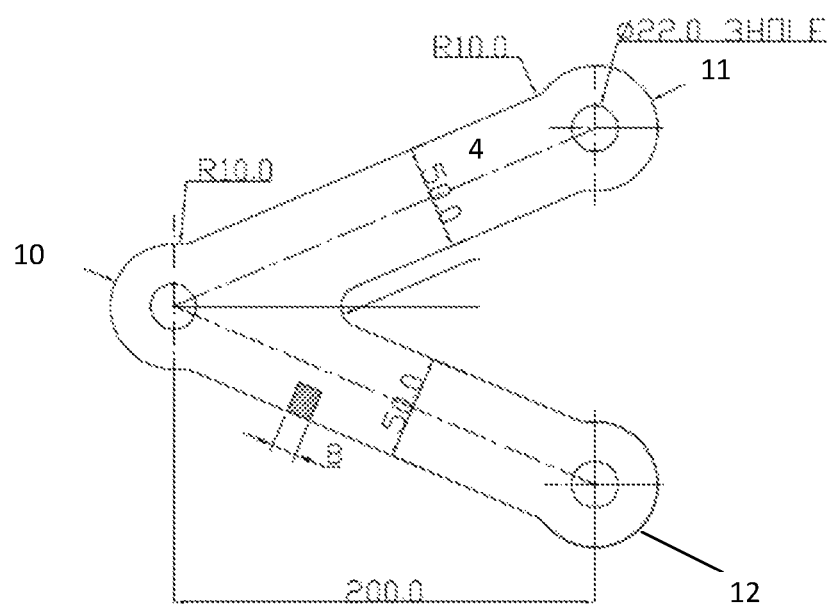
FIG. 2 illustrates a top schematic view of a triangular plate which is part of the saver assembly according to an embodiment mentioned herein.

FIG. 2 illustrates a top schematic view of a triangular plate which is part of the saver assembly according to an embodiment mentioned herein. Here, the plate may be triangularly curved between edges 11, 12 to accommodate a dead end connector 4 with a power line. In an embodiment, the triangular flat plate is made from mild steel.

Figure 3:
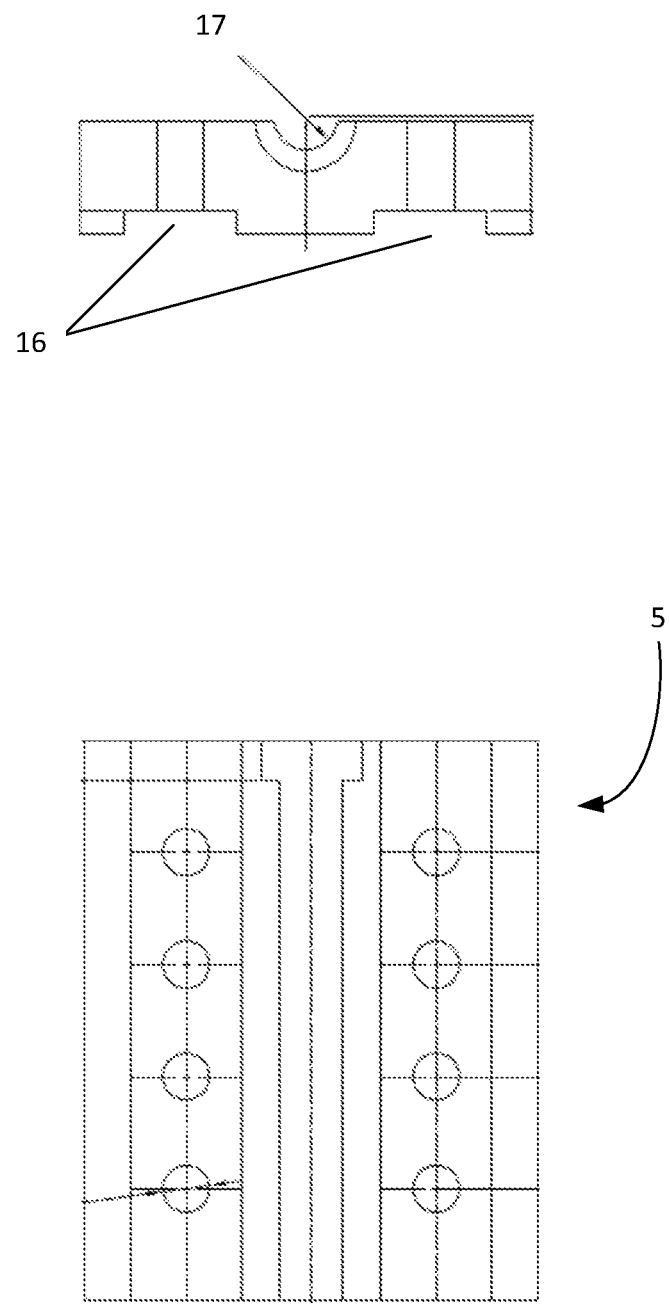
FIG. 3 illustrates a top schematic view of a bypass clamp which is part of the saver assembly according to an embodiment mentioned herein.

FIG. 3 illustrates a top schematic view of a bypass clamp which is part of the saver assembly according to an embodiment mentioned herein. The bypass clamp 5 has multiple U shaped grooves 16 on top and an arc groove 17 centered on opposite side of the grooves to accommodate the power line.

In an embodiment, the bypass clamp secures other end of the plurality of turn buckle 3 through metal plates 6 which is sitting on the grooves and tightened to the clamp 5 using plurality of nuts and bolts, thus forming the saver assembly. In an example embodiment, the bypass clamp 5 may be made from an aluminium alloy.

Figure 4:
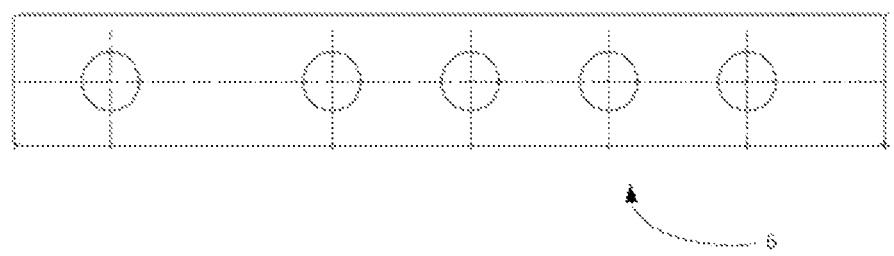
FIG. 4 illustrates a top schematic view of a steel plate being part of the saver assembly according to an embodiment mentioned herein.

FIG. 4 illustrates a top schematic view of a steel plate being part of the saver assembly according to an embodiment mentioned herein. The steel plate is pushed into the grooves and an extended portion from below helps in securing the turn buckle with the bypass clamp. Thus, the clamp safely secures the turn buckle by minimizing possibility of loosening due to pressure from any type of power line.

In an embodiment, the saver assembly accommodates any type of transmission or power line of any ratings and configurations. Here, the saver assembly may also be used for any type of supporting transmission line infrastructure having any configurations.

Figure 5:
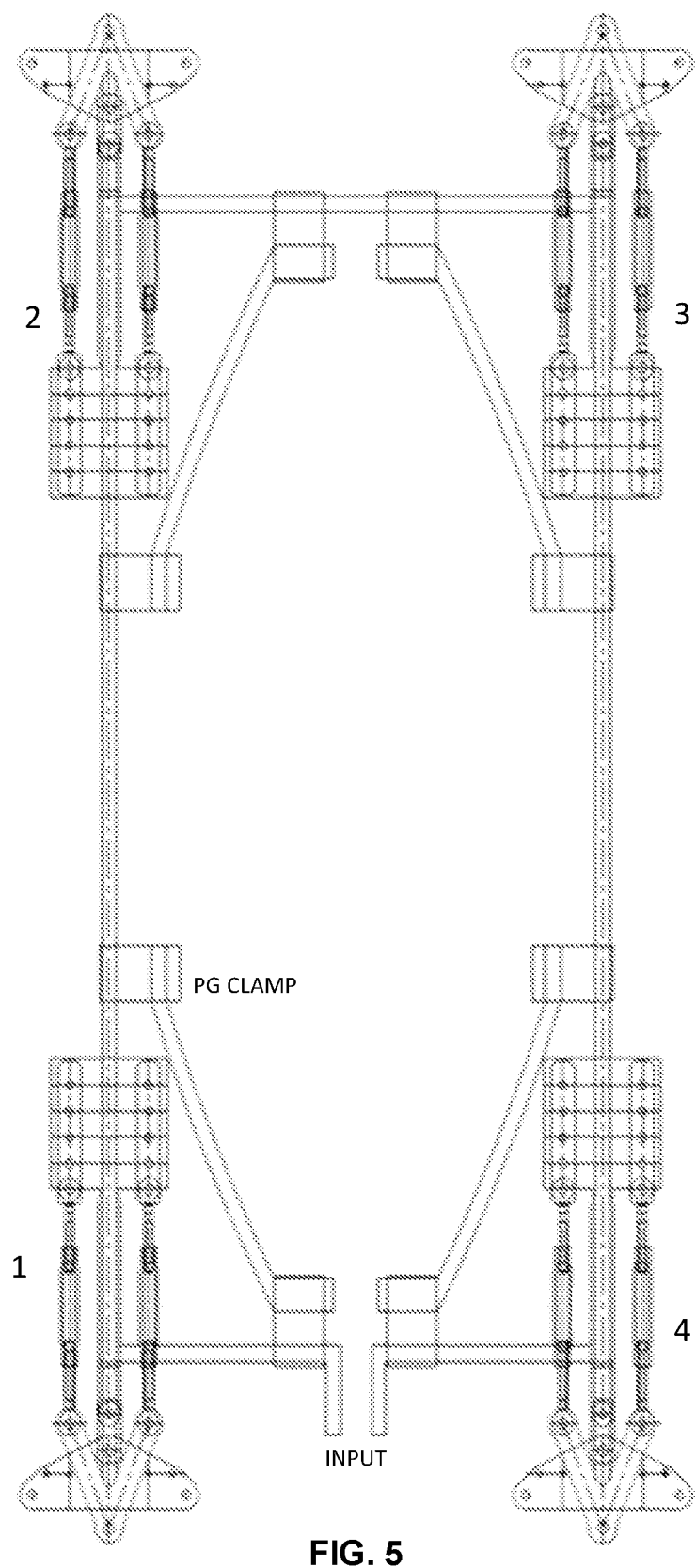
FIG. 5 illustrates a saver assembly arranged in a loop for heating cycle testing as per IS 2486 standard according to an embodiment mentioned herein.

FIG. 5 illustrates an example embodiment of a saver assembly arranged in a loop for heating cycle testing as IS 2486 standard according to an embodiment mentioned herein. Further, the Heat Cycle test for checking the maximum working temperature of the clamp during the maximum electric load as per IS: 2486 (Part-I):1993 Reaffirmed 2013. CI. No. 12.1.1(b) after the 250 cycles, the maximum temperature was observed to be 44.2 éC against the maximum allowable temperature 95 éC.

Also, the Electrical resistance test was performed to check the variation of the resistance before and after the Heat Cycle test, as per IS: 2486 (Part-I):1993 Reaffirmed 2013. CI. No. 12.1.1(a). The resistance before the Heat Cycle test and after the heat cycle test was observed to be 60.5% and 59.5% respectively that of the equivalent length of the conductor against the allowable limit of 75%.

In addition to this, the magnetic power loss test was carried out to check the power loss across the SAVER Assembly, as per IEC 61284, CI. No. 12 and results were found satisfactory.

A Bypass Assembly clamp (BPA) was developed that shall hold the entire mechanical loads exerted on it whenever snapping of conductor begins due to failure of dead end clamp, which may create a massive disturbance to the life and property. Further, electrical continuity was established through an additional Jumper which shall save the entire electrical load during the normal and abnormal condition.

Figure 6:
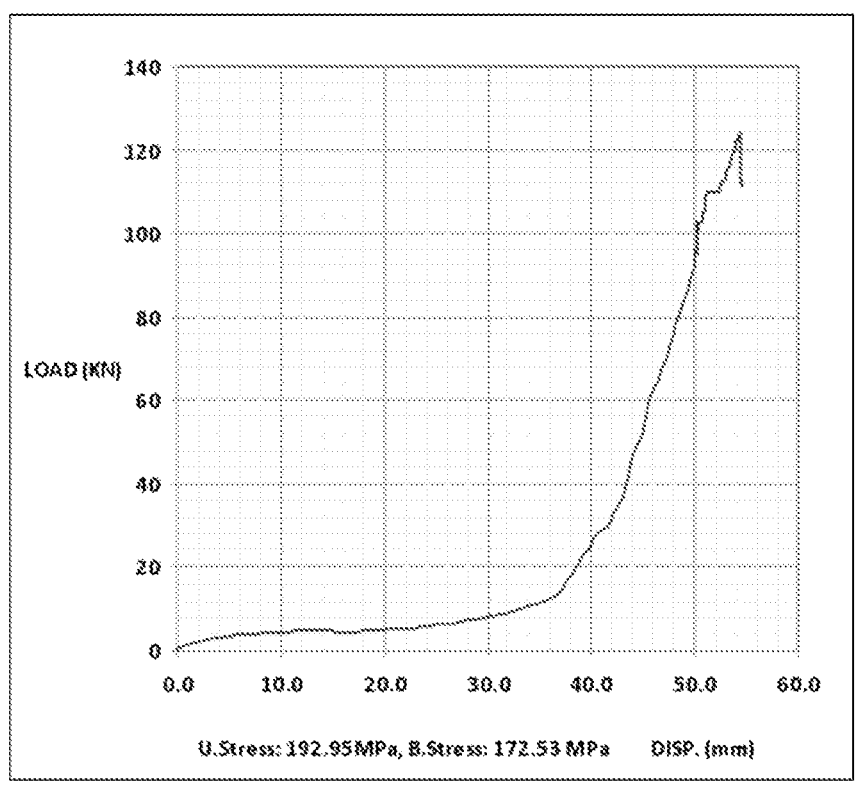
FIG. 6 illustrates a graph of a mechanical slip strength test as per IS: 2486 (Part-I):1993 Reaffirmed 2013. Cl. No. 11.1.2. according to an embodiment mentioned herein.

FIG. 6 illustrates a graph of a mechanical slip strength test as per IS: 2486 (Part-I):1993 Reaffirmed 2013. Cl. No. 11.1.2. according to an embodiment mentioned herein. Again new prototype assembly was manufactured for the testing purpose. During the mechanical slip strength test, the newly designed SAVER Assembly sustained up to 124 kN as against the standard requirement of 123.9 kN and passed the test successfully as per the relevant standards applicable for Transmission Hardware. The saver assembly thus developed offers a financially viable opportunity to increase the age of the existing transmission lines as well as eliminate the snapping of conductor to the ground; thereby avoiding tripping of line for such developing fault at dead end.

This innovative solution can be implemented across all voltage levels having single conductor configuration replacing conventional type Dead End Clamp on tension towers. Our experience in this area can be used effectively by other transmission utilities across the world in overcoming their dead end failure issues successful.

This arrangement of saver assembly not only prevents snapping of conductor but also continue path of the current through bypass arrangement to avoid interruption of power supply.

In the instant saver assembly arrangement, it is unable to capture the information of conductor snapping. We are exploring to have current sensors for bypass conductor, which can be captured current flow through bypass conductor and transmitted to control center through communication network.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

I claim:

1. A saver assembly comprising:
a plurality of triangular flat plates 1 with rounded edges (10, 11, 12), wherein the plate is triangularly curved between edges (11, 12) to accommodate a dead end connector (4) with any type of power or transmission line;
a yoke plate (2) having two rounded edges (13, 14) respectively and a triangular shaped third edge, wherein the yoke plate secures the plurality of triangular flat plates with nuts and bolts;
a plurality of turn buckle (3), each having one end connected to two of the edges of the triangular plate (1); and
a bypass clamp (5) having multiple U shaped grooves (16) on top and an arc groove (17) centered on opposite side of the grooves to accommodate the power line, wherein the bypass clamp secures another end of plurality of turn buckle (3) through metal plates (6) which is sitting on the grooves and tightened to the clamp (5) using plurality of nuts and bolts, thus forming the saver assembly.

2. The saver assembly as claimed in claim 1, wherein the turn buckle swivels axially along body (15) when there is a pressure on the power line.

3. The saver assembly as claimed in claim 1, wherein the bypass clamp (5) is made from an aluminium alloy.

4. The saver assembly as claimed in claim 1, wherein the dead end connector (4) is made from an aluminium alloy.

5. The saver assembly as claimed in claim 1, wherein the triangular flat plate is made from mild steel.

6. The saver assembly as claimed in claim 1, wherein the plurality of turn buckle (3) is secured to the triangular flat plates (1) through nuts and bolts.

7. The saver assembly as claimed in claim 1, further comprising a steel plate, and wherein the triangular flat plate and the steel plate is made of any thickness.

8. The saver assembly as claimed in claim 1, wherein the saver assembly accommodates any type of transmission or power line of any ratings and configurations.

9. The saver assembly as claimed in claim 1 or 8, wherein the saver assembly is used for any type of supporting transmission line infrastructure having any configurations.

* * * * *